(12) United States Patent
Laur et al.

(10) Patent No.: US 7,504,816 B2
(45) Date of Patent: Mar. 17, 2009

(54) CIRCUIT FOR MULTIPLEXING DIGITAL AND ANALOG INFORMATION VIA SINGLE PIN OF DRIVER FOR SWITCHED MOSFETS OF DC-DC CONVERTER

(75) Inventors: Steven Patrick Laur, Raleigh, NC (US); Wei Dong, Cary, NC (US); Mehul Dilip Shah, Morrisville, NC (US)

(73) Assignee: Intersil Americas Inc., Milpitas, CA (US)

( * ) Notice: Subject to any disclaimer, the term of this patent is extended or adjusted under 35 U.S.C. 154(b) by 318 days.

(21) Appl. No.: 11/359,076

(22) Filed: Feb. 22, 2006

(65) Prior Publication Data

US 2007/0069698 A1 Mar. 29, 2007

Related U.S. Application Data

(60) Provisional application No. 60/721,210, filed on Sep. 28, 2005.

(51) Int. Cl.
G05B 24/00 (2006.01)
H04J 15/00 (2006.01)
G08C 15/00 (2006.01)

(52) U.S. Cl. .......................... 323/354; 323/351; 307/2; 340/825.59; 370/529

(58) Field of Classification Search ................ 323/351, 323/318, 354; 340/825.59, 825, 825.63; 307/2, 1; 370/529

See application file for complete search history.

(56) References Cited

U.S. PATENT DOCUMENTS

| | | | |
|---|---|---|---|
| 5,508,650 A * | 4/1996 | Grimm et al. | 327/365 |
| 5,696,480 A * | 12/1997 | Hirai | 370/480 |
| 6,094,039 A | 7/2000 | Farrenkopf | 323/283 |
| 6,246,220 B1 * | 6/2001 | Isham et al. | 323/224 |
| 6,286,127 B1 * | 9/2001 | King et al. | 716/8 |
| 6,507,215 B1 * | 1/2003 | Piasecki et al. | 326/41 |
| 6,765,372 B2 * | 7/2004 | Isham | 323/224 |
| 6,798,260 B1 * | 9/2004 | Wittlinger | 327/157 |
| 7,098,632 B2 * | 8/2006 | Chen et al. | 323/222 |
| 7,211,966 B2 * | 5/2007 | Green et al. | 315/224 |
| 7,233,131 B2 * | 6/2007 | Lin et al. | 323/268 |

* cited by examiner

*Primary Examiner*—Akm E Ullah
*Assistant Examiner*—Harry Behm
(74) *Attorney, Agent, or Firm*—Fogg & Powers LLC

(57) ABSTRACT

Multiple characteristics of a DC-DC converter, such as its mode of operation (e.g., either forced continuous conduction mode, or discontinuous conduction mode), and an operational parameter (such as the dead-time between switching times of the output switching devices (upper and lower MOSFETs) of the converter, whose associated driver integrated circuit has a pin usage that leaves only a single pin available for auxiliary purposes, are programmed by a single pin-based digital and analog information multiplexing circuit that couples both digital information and analog information within the same control signal to the driver IC by way of only the one available pin.

18 Claims, 2 Drawing Sheets

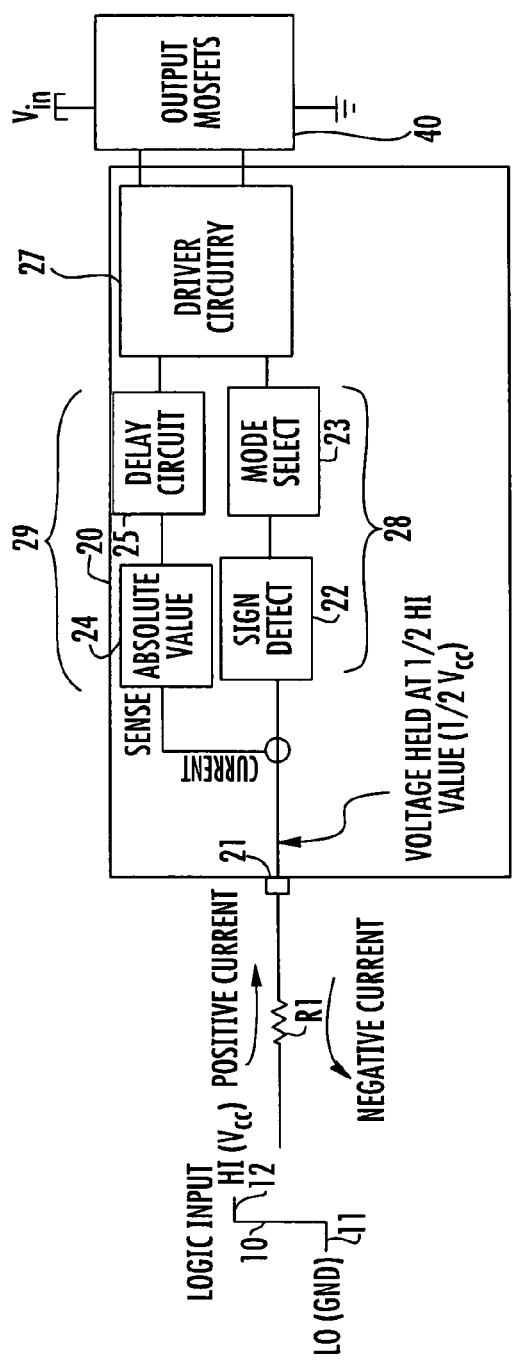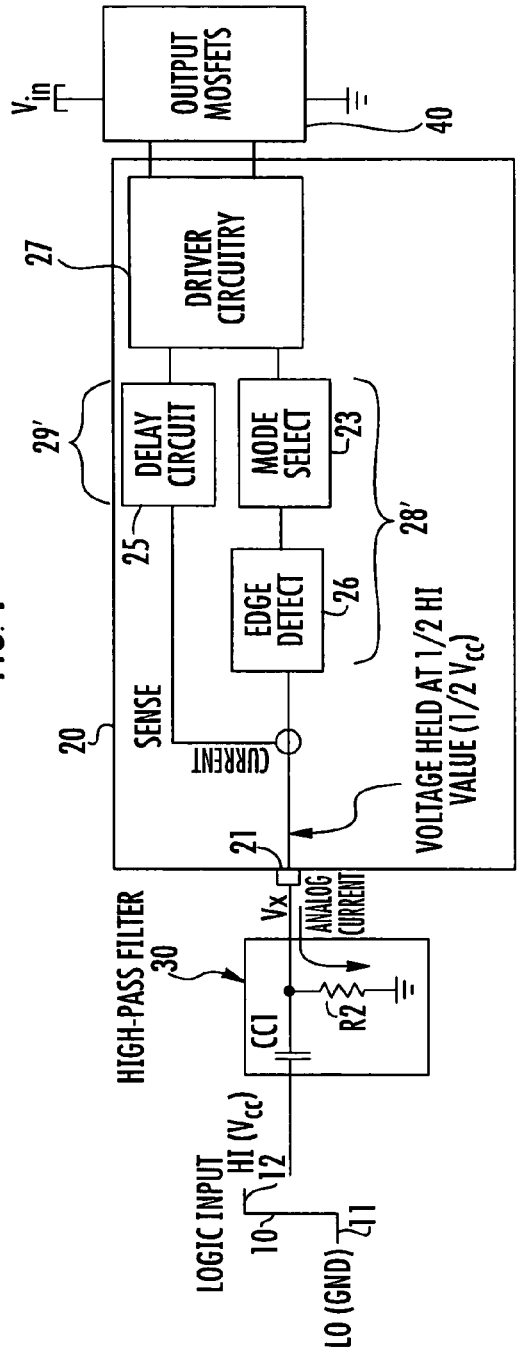

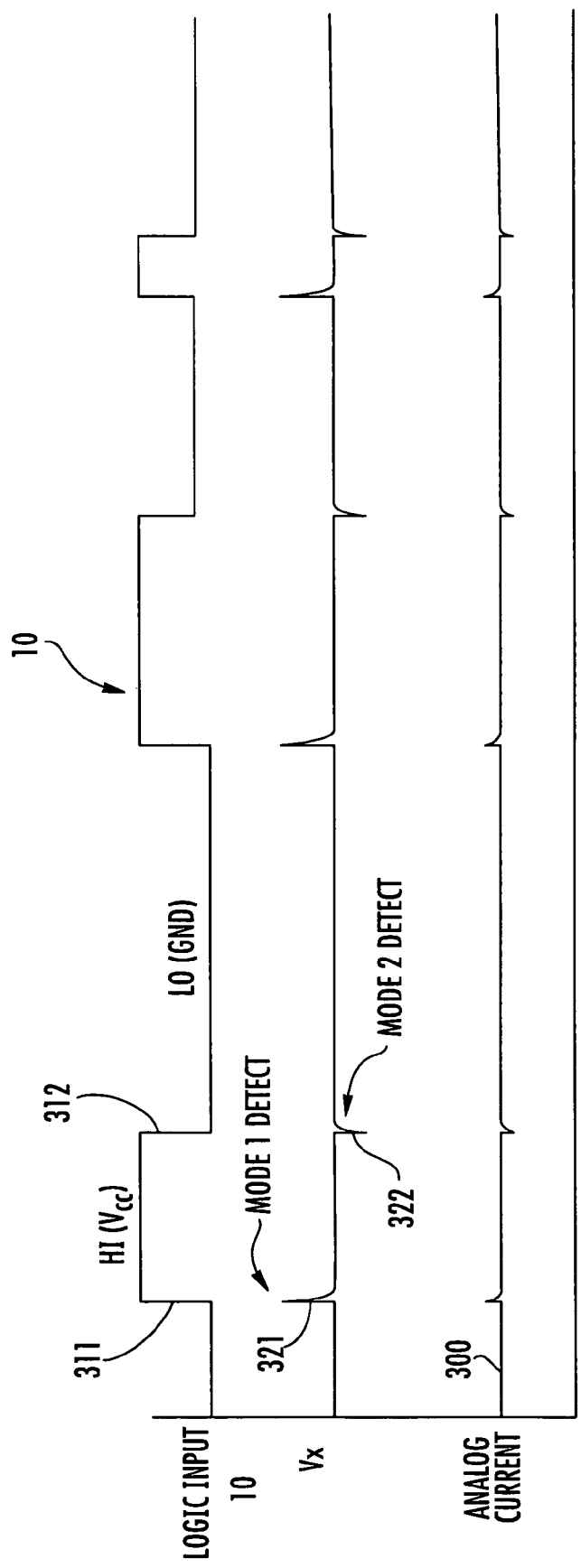

CIRCUIT FOR MULTIPLEXING DIGITAL AND ANALOG INFORMATION VIA SINGLE PIN OF DRIVER FOR SWITCHED MOSFETS OF DC-DC CONVERTER

CROSS-REFERENCE TO RELATED APPLICATION

The present application claims the benefit of co-pending U.S. Patent Application Ser. No. 60/721,210, filed Sep. 28, 2005, by Steven P. Laur et al, entitled: "Circuit for Multiplexing Digital and Analog Information Via Single Pin of Driver for Switched MOSFETs of DC-DC Converter," assigned to the assignee of the present application and the disclosure of which is incorporated herein.

FIELD OF THE INVENTION

The present invention relates in general to DC power supplies and control/driver circuits therefor, and is particularly directed to a circuit for multiplexing both digital information and analog information to the driver of a DC-DC converter by way of a single input pin. The digital information component may be used to control the mode of operation of the DC-DC converter (e.g., either forced continuous conduction mode (FCCM), or discontinuous conduction mode (DCM)). The analog information component may be used to program an operational parameter (such as the dead-time between switching times of the output switching devices (upper and lower MOSFETs) of the converter. The single input pin is the only pin available in a multi-pin integrated circuit (IC), such as an eight-pin, half-bridge driver IC, containing control/driver circuitry for the output MOSFETs. As a result, the invention is capable of providing a higher level of feature integration than is currently available in such circuits.

BACKGROUND OF THE INVENTION

In addition to the standard set of driver functions for the control/driver circuitry for controlling the switching times of the output MOSFETs of a DC-DC converter, there are two additional functions that may be desired for some applications. A first of these functions is the ability to control the mode of operation of the driver as either forced continuous conduction mode (FCCM) or discontinuous conduction mode (DCM). This is largely desired in portable power supply applications, and is usually implemented by applying a digital signal to a logic input pin of the IC, the logical state of the digital signal designating the mode of operation. A second function is to allow for programming of the dead-time between the switching of the output MOSFETs, which is important for optimizing switching performance over a wide selection of the power devices.

In today's driver IC market, an eight-pin SOIC package is one of the most popular for half-bridge driver implementations. Unfortunately, an eight pin package means that only a single pin is available for auxiliary functions, such as the two control/programming functions mentioned above, since the other seven pins are already taken for the basic operation of the driver IC. The problem is how to enable both of the above functions to be supplied to the driver IC by means of the one available pin.

SUMMARY OF THE INVENTION

In accordance with the present invention, the need to control/program multiple operational characteristics of a DC-DC converter, such as its mode of operation (e.g., either forced continuous conduction mode, or discontinuous conduction mode), and an operational parameter (such as the dead-time between switching times of the output switching devices (upper and lower MOSFETs) of the converter, whose associated driver integrated circuit has a pin usage that leaves only a single pin available for auxiliary purposes, is successfully addressed by a single pin-based digital and analog information multiplexing circuit, that is effective to couple both digital information and analog information within the same control signal to the driver IC by way of only the one available pin.

To this end, an input circuit of a first embodiment of the multiplexing circuit of the invention comprises a control signal-coupling resistor that is coupled to an input/control pin of a driver integrated circuit which controls the switching operations of upper and lower MOSFETs of output MOSFET circuitry of a DC-DC converter, such as a buck-mode DC-DC converter. Digital information conveyed by the control signal is represented by its logical state, which varies between a first voltage level and a second voltage level. These two logical states of the control signal may be used to represent respectively different operational modes (e.g., FCCM and DCM, referenced previously) of the output MOSFET driver circuitry within the driver IC.

In order to detect the logical state of the digital information component of the control signal, the internal circuitry of the driver IC is operative to maintain the voltage at the input/control pin at a reference voltage value equal to half the difference between the first and second voltage levels of the control signal. Holding the voltage applied to the single pin at this midway reference voltage value allows the binary value of the digital information within the control signal to be determined based upon whether current is flowing 'into' or 'out of' the pin.

For this purpose, the internal circuitry of the driver IC is augmented to include a digital information extraction circuit having a current polarity detector coupled to the pin. The current polarity detector detects whether current is flowing in a first direction—into the pin, or in a second direction—out of the pin, based upon which of the two logical states of the control signal is applied to the coupling resistor. If the logical state of the control signal is at the first logical state, corresponding to a first voltage level (e.g., ground), the reference voltage level applied to the pin will be higher than that applied to the coupling resistor, so that current will flow 'out of' the pin through the coupling resistor. This outward flowing current is detected by the current polarity detector as a negative flowing current. On the other hand, if the logical state of the control signal is at the second logical state, corresponding to a second voltage level (e.g., Vcc), the reference voltage level applied to the pin will be lower than that (Vcc) applied to the coupling resistor, so that current will flow 'into' the pin from the coupling resistor and will be detected by the current polarity detector as a positive flowing current.

Namely, the direction of current flow relative to the single pin determines the binary state of the digital information component within the control signal, and may be used to set the mode in which the driver IC is to operate (e.g., forced continuous conduction mode (FCCM) corresponding to continuous pulse width modulation (PWM), and fully synchronous operation, or discontinuous conduction mode (DCM) corresponding to the ability of the driver to transition from fixed frequency PWM operation to pulse frequency modulation operation depending on the load, described above). The output of the current polarity detector is coupled as a control input to a mode select circuit, which sets the driver IC to operate in either FCCM or DCM, based on the logic state (voltage level) of the control signal, thereby achieving the first desired function to be performed —'digital' mode control.

Analog information within the control signal (which may be used to set a desired dead-time, as described above) is represented by the magnitude of the analog current flowing through the single available pin. This analog current value is defined in accordance with the voltage difference between the control signal's two logical states and the aforementioned reference voltage, divided by the value of the control signal-coupling resistor. In order to achieve the second desired function, e.g., programming the dead-time between switching of the output MOSFETs, as described above, the absolute value of the current flowing through the single pin (which is the same for both negative flowing current and positive flowing current, since the reference voltage at which the pin is maintained is midway between the first and second voltage levels) is sensed by means of an absolute value circuit within an analog information extraction circuit.

The absolute value of the current flowing through the single pin is equal to the value of the midway voltage divided by the value of the coupling resistor, with the value of the coupling resistor being the programming mechanism for dead-time for a given application. Dead-time is (directly or inversely) proportional to the absolute value of the current flowing through the single pin. Where dead-time is directly proportional to current then the lower the value of the coupling resistor, the longer the dead-time, and the higher the value of the coupling resistor, the shorter the dead-time. Conversely, where dead-time is inversely proportional to current, then the lower the value of the coupling resistor, the shorter the dead-time, and the higher the value of the coupling resistor, the longer the dead-time.

The absolute value of the current sensed by the absolute value circuit is coupled to a delay circuit, which sets the delay or dead-time between switching (break-before-make) of the output MOSFETs, in proportion to the absolute value of the sensed analog current. Thus, the user has the ability to program the dead-time simply by changing the resistor value of the control signal-coupling resistor. Since the magnitude of the sensed current is the same in both positive and negative flowing directions, the dead-time set point is independent of the digital information component within the control signal applied to the single pin.

In accordance with a second, edge detection-based embodiment, the control signal, rather than being coupled directly through a coupling resistor to the single input pin, is coupled instead through a differentiator circuit or high pass filter, comprised of a series capacitor, through which the control signal containing both digital and analog control information is coupled to the single pin, and a resistor coupled between the pin and ground. As in the first embodiment, a reference voltage midway between the first and second voltage levels of the control signal is applied to the single pin. As a consequence, with the high pass filter's resistor being coupled to ground, current through the resistor will always flow outwardly from the pin to ground, and will have a magnitude equal to the reference voltage divided by the value of the grounded resistor. This allows the resistor to serve as the mechanism for programming the magnitude of the analog current through the single pin and thereby the desired dead-time.

Namely, as in the first embodiment, the analog information component conveyed by the control signal is represented by the magnitude of the analog current flowing through the single available pin. However, rather than being based upon the voltage 'difference' between the control signal's two logical states (as divided by the value of the coupling resistor), the magnitude of the analog current in the second embodiment is based upon the value of the reference voltage (as divided by the value of the grounded resistor). Since the polarity of the analog current through the single pin does not change, there is no absolute value circuit within an analog information extraction circuit. Instead, a steady state value of the sensed current is coupled directly to a delay circuit within an analog information extraction circuit, which sets the delay or dead-time between switching (break-before-make) of the output MOSFETs in proportion to the sensed analog current value, as in the first embodiment.

The digital information component of the control signal in the second embodiment is represented by the 'direction' of a transition in the logical state of the control signal. A positive-going, or low-to-high transition or edge in the control signal, upon being differentiated by the high-pass filter, produces a positive pulse in the voltage characteristic produced the single available pin, while a negative-going, or high-to-low transition or edge in the control signal, when differentiated by the high-pass filter, produces a negative pulse in the voltage characteristic at the single available pin.

Namely, in the second embodiment, the polarity of a voltage pulse within the voltage characteristic produced by the high-pass filter is used to represent the digital information (FCCM or DCM). In order to detect the polarity of such pulses, an edge detector within a digital information extraction circuit is coupled to the pin. The output of the edge detector will be one of two logic voltage levels (as determined by the polarity of the detected edge/pulse) and is coupled to a mode select circuit. As in the first embodiment, the mode select 23 sets the driver to operate in either FCCM or DCM. In the second embodiment this is based on the polarity of a logical 'transition' between the respective logical states of the control signal, thereby achieving the desired digital mode control.

BRIEF DESCRIPTION OF THE DRAWINGS

FIG. 1 diagrammatically illustrates a digital and analog information multiplexing circuit for operational mode control and programming switching circuit dead-time for a DC-DC converter, in accordance with a first embodiment of the present invention;

FIG. 2 diagrammatically illustrates a digital and analog information multiplexing circuit for operational mode control and programming switching circuit dead-time for a DC-DC converter, in accordance with a second embodiment of the present invention; and FIG. 3 is a timing diagram associated with the operation of the second embodiment of the invention shown in FIG. 2.

DETAILED DESCRIPTION

Before describing the details of non-limiting embodiments of the single pin-based digital and analog information multiplexing circuit of the present invention, it should be observed that the inventive multiplexing circuit resides primarily in a modular arrangement of conventional electronic circuits and components thereof. In terms of a practical implementation that facilitates its manufacture as a printed circuit-based package that may be readily incorporated into the driver circuitry for a DC-DC converter, this modular arrangement may be readily implemented as field programmable gate array (FPGA) and application specific integrated circuit (ASIC) chip set. As a consequence, the circuit configuration of the inventive arrangement and the manner in which it is interfaced with a DC-DC converter's output MOSFET driver circuitry and a control/programming pin therefor have been illustrated in readily understandable block diagram format, which shows only those specific details that are pertinent to the present invention, so as not to obscure the disclosure with details that will be readily apparent to one skilled in the art having the benefit of present description.

Attention is now directed to FIG. 1, which diagrammatically illustrates a first embodiment of the single pin-based digital and analog information multiplexing circuit of the invention. As shown therein, a digital and analog information-conveying control signal 10 is applied through a control signal-coupling resistor R1 to an input/control pin 21 of a driver IC 20, that is used to control the switching operations of upper and lower MOSFETs of output MOSFET circuitry 40 of a DC-DC converter (such as a buck-mode DC-DC converter, as a non-limiting example).

Digital information conveyed by the control signal 10 is represented by the logical state thereof, which varies between a first voltage level 11 (e.g., ground (GND)) and a second voltage level 12 (e.g., Vcc). These two logical states of the control signal 10 may be used to represent respectively different operational modes (e.g., FCCM and DCM, referenced previously) of output MOSFET driver circuitry 27 within the driver IC 20.

In order to detect the logical state of the digital information component of the control signal 10, the internal circuitry of the driver IC 20 is augmented to maintain the voltage at the input/control pin 21 at a reference voltage value (Vcc/2) equal to half the difference between the first and second voltage levels 11 and 12 of the control signal 10. Holding the voltage at pin 21 at this midway value allows the binary value of the digital information within the control signal to be determined based upon whether current is flowing 'into' or 'out of' the pin 21.

For this purpose, a digital information extraction circuit 28 includes a current polarity or sign detector 22 coupled to pin 21. The current polarity detector 22 detects whether current is flowing in a first direction—into the pin 21 from resistor R1, or in a second direction—out of the pin 21 and through resistor R1, based upon which of the two logical states of control signal 10 is applied to resistor R1. If the logical state of the control signal is at the first logical state, corresponding to the first voltage level 11 (GND), the voltage level (Vcc/2) at pin 21 will be higher than that (GND) applied to the resistor R1, so that current will flow 'out of' pin 21 through resistor R1. This outward flowing current is detected by sign detector 22 as a negative flowing current. On the other hand, if the logical state of the control signal is at the second logical state, corresponding to the second voltage level 12 (Vcc), the reference voltage level (Vcc/2) at pin 21 will be lower than that (Vcc) applied to the resistor R1, so that current will flow 'into' pin 21 from resistor R1 and be detected by sign detector 22 as a positive flowing current.

Thus, the direction of current flow relative to pin 21 determines the binary state of the digital information component within the control signal, and may be used to set the mode in which the driver IC is to operate (e.g., forced continuous conduction mode (FCCM) corresponding to continuous pulse width modulation (PWM), and fully synchronous operation, or discontinuous conduction mode (DCM) corresponding to the ability of the driver to transition from fixed frequency PWM operation to pulse frequency operation depending on the load, as described above). To this end, the output of the sign detector 22 is coupled as a control input to mode select circuit 23, which sets the driver IC to operate in either FCCM or DCM, based on the logic state (voltage level) of the control signal 10, thereby achieving the first desired function to be performed—'digital' mode control.

Analog information conveyed by the control signal 10 (which may be used to set a desired dead-time, as described above) is represented by the magnitude of the analog current flowing through pin 21. This analog current value is defined in accordance with the voltage difference between the control signal's two logical states 11 (GND) and 12 (Vcc), divided by the value of the control signal-coupling resistor R1. In order to achieve the second desired function, e.g., programming the dead-time between switching of the output MOSFETs 40, as described above, the absolute value of the current flowing through pin 21 (which is the same for both negative flowing current and positive flowing current, since the reference voltage (Vcc/2) at which pin 21 is maintained is midway between the first (GND) and second (Vcc) voltage levels) is sensed by means of an absolute value circuit 24 within an analog information extraction circuit 29.

The absolute value of the current flowing through pin 21 is equal to Vcc/2*R1, with the value of R1 being the programming mechanism for dead-time for a given application. As a non-limiting example, the dead time may range between 5 ns and 50 ns, with 20 ns being a typical value. As noted previously, dead-time is (directly or inversely) proportional to the absolute value of the current flowing through pin 21. Where dead-time is directly proportional to current, then the lower the value of R1, the longer the dead-time, and the higher the value of R1, the shorter the dead-time. Conversely, where dead-time is inversely proportional to current, then, the lower the value of R1, the shorter the dead-time, and the higher the value of R1, the longer the dead-time.

The absolute value of the current sensed by the absolute value circuit 24 is coupled to a delay circuit 25, which sets the delay or dead-time between switching (break-before-make) of the output MOSFETs 40, in proportion to the absolute value of the sensed analog current. This means that the user has the ability to program the dead-time simply by changing the resistor value of resistor R1. Since the magnitude of the sensed current is the same in both positive and negative flowing directions, the dead-time set point is independent of the digital information component within the control signal applied to pin 21.

Attention is now directed to FIG. 2, which diagrammatically illustrates a second, edge detection-based embodiment of the single pin-based digital and analog information multiplexing circuit of the invention. In accordance with this embodiment, the control signal 10, which has the same voltage level parameters as in the embodiment of FIG. 1, rather than being coupled directly through a resistor to the input pin 21, is coupled instead thereto through a differentiator circuit or high pass filter 30. Differentiator circuit 30 is comprised of a series capacitor C1, through which the control signal 10 containing both digital and analog control information is coupled to pin 21, and a resistor R2 coupled between pin 21 and ground.

As in the first embodiment, pin 21 is maintained at a reference voltage (Vcc/2) midway between the first and second voltage levels 11 and 12, respectively, that are used to define the logic states of the digital information component conveyed by the control signal 10. As a consequence, with resistor R2 being coupled to ground, current through the resistor R2 always flows outwardly from the pin 21 to ground, and has a magnitude equal to Vcc/2*R1. This allows the resistor R2 to serve as the mechanism for programming the magnitude of the analog current through pin 21 and thereby the desired dead-time.

Namely, as in the first embodiment, the analog information component conveyed by the control signal 10 is represented by the magnitude of the analog current flowing through pin 21. However, rather than being based upon the voltage difference between the control signal's two logical states (as divided by the value of the coupling resistor R1), the magnitude of the analog current in the second embodiment is based upon the value of the reference voltage Vcc/2 (as divided by the value of the grounded resistor R2). Since the polarity of the analog current through pin 21 does not change, the need for an absolute value circuit within an analog information extraction circuit 29' is obviated. Instead, the steady state value of the sensed current, shown as the analog current 300 in the timing diagram of FIG. 3, is coupled directly to delay circuit 25 within analog information extraction circuit 29', which sets the delay or dead-time between switching (break-before-make) of the output MOSFETs 40, in proportion to the sensed analog current value, as in the first embodiment.

The digital information component of the control signal in the embodiment of FIG. 2 is represented by the 'direction' of a transition in the logical state of control signal 10. Specifically, as shown in the timing diagram of FIG. 3, a positive-going, or low-to-high transition or edge 311 in control signal 10, when differentiated by high-pass filter 30, produces a positive pulse 321 (Mode 1 (e.g., FCCM) detect) in the voltage characteristic Vx produced at pin 21, while a negative-going, or high-to-low transition or edge 312 in control signal 10, when differentiated by high-pass filter 30, produces a negative pulse 322 (Mode 2 (e.g., DCM) detect) in the voltage characteristic Vx produced at pin 21.

Namely, in the second embodiment of the invention, the polarity of a voltage pulse 321/322 within the voltage characteristic Vx produced by the high-pass filter 30 is used to represent the digital information (here FCCM or DCM). In order to detect the polarity of such pulses, an edge detector 26 within a digital information extraction circuit 28' of the driver IC 20 is coupled to the pin 21. The output of edge detector 26 will be one of two logic voltage levels (as determined by the polarity of the detected edge/pulse 321/322) and is coupled to mode select circuit 23. As in the first embodiment, the mode select circuit 23 sets the driver IC to operate in either FCCM or DCM, based on the polarity of a logical transition 311/312 of the control signal 10, thereby achieving the desired digital mode control.

As will be appreciated from the foregoing description, the need to control/program multiple operational characteristics of a DC-DC converter, such as its mode of operation (e.g., either forced continuous conduction mode, or discontinuous conduction mode), and an operational parameter (such as the dead-time between switching times of the output switching devices (upper and lower MOSFETs) of the converter, whose associated driver integrated circuit has a pin usage that leaves only a single pin available for auxiliary purposes, is successfully addressed by a single pin-based digital and analog information multiplexing circuit that makes it possible to couple both digital information and analog information within the same control signal to the driver IC by way of only the one available pin. Consequently, the present invention is capable of providing a higher level of feature integration than is currently available in such circuits.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A circuit for multiplexing digital information and analog information contained in a control signal, by way of a single pin of a driver circuit for a DC-DC converter, wherein said digital information is used to select one of plural modes of operation of said converter, and wherein said analog information is used to program an operational parameter of said converter, said circuit comprising:

an input circuit through which said control signal is applied to said single pin of said driver circuit;

a digital information extraction circuit coupled between said single pin and said driver circuit, and being operative to extract said digital information from said control signal and to supply said digital information to said driver circuit; and an analog information extraction circuit coupled between said single pin and said driver circuit, and being operative to extract said analog information from said control signal and to supply said analog information to said driver circuit;

wherein said digital information extraction circuit is operative to extract said digital information from said control signal based upon a direction of flow of an analog current through said single pin, said analog current flowing through said single pin in response to application of said control signal to said input circuit; and wherein said analog information extraction circuit is operative to extract said analog information from said control signal based upon a magnitude of said analog current flowing through said single pin in response to application of said control signal to said input circuit.

2. The circuit according to claim 1, wherein said digital information extraction circuit is operative to extract said digital information from said control signal based upon a polarity of an electrical condition produced at said single pin in response to application of said control signal to said input circuit.

3. The circuit according to claim 2, wherein said digital information is represented by transitions between logic voltage levels of said control signal, and said analog information is represented by the value of analog current flowing through said single pin in response to application of said control signal to said input circuit.

4. The circuit according to claim 3, wherein said digital information extraction circuit is operative to extract said digital information from said control signal based upon the polarity of a voltage pulse produced at said single pin in response to application of said control signal to said input circuit.

5. The circuit according to claim 4, wherein said input circuit comprises a high-pass filter.

6. The circuit according to claim 1, wherein said digital information is represented by logic voltage levels of said control signal, and said analog information is represented by the absolute value of analog current flowing through said single pin in response to application of said control signal to said input circuit.

7. The circuit according to claim 6, wherein said input circuit comprises a programming resistor through which said control signal is coupled to said single pin.

8. The circuit according to claim 1, wherein said digital information is representative of one of forced continuous conduction mode and discontinuous conduction mode of operation of said DC-DC converter, and wherein said analog information is representative of dead-time between switching times of output switching devices of said DC-DC converter.

9. A method of multiplexing digital information and analog information contained in a control signal, by way of a single pin of a driver circuit for a DC-DC converter, wherein said digital information is used to select one of plural modes of operation of said converter, and wherein said analog information is used to program an operational parameter of said converter for each of said plural modes of operation of said converter, said method comprising the steps of:
  (a) coupling said control signal through an input circuit through to said single pin of said driver circuit to produce a signal at said single pin of said driver circuit;
  (b) processing said signal produced in step (a) at said single pin of said driver circuit so as to extract therefrom said digital information, and supplying said digital information to said driver circuit, said digital information represented by logic voltage levels of said control signal; and
  (c) processing said signal produced in step (a) at said single pin of said driver circuit so as to extract therefrom said analog information, and supplying said analog information to said driver circuit, said analog information represented by the absolute value of an analog current flowing through said single pin in response to application of said control signal to said input circuit.

10. The method according to claim 9, wherein said digital information is representative of one of forced continuous conduction mode and discontinuous conduction mode of operation of said DC-DC converter, and wherein said analog information is representative of dead-time between switching times of output switching devices of said DC-DC converter.

11. The method according to claim 9, wherein step (b) comprises extracting said digital information from said control signal based upon a polarity of an electrical condition produced at said single pin in response to application of said control signal to said input circuit, and step (c) comprises extracting said analog information from said control signal in accordance with said analog current flowing through said single pin in response to application of said control signal to said input circuit.

12. The method according to claim 11, wherein step (b) comprises extracting said digital information from said control signal in accordance with the direction of flow of said analog current through said single pin in response to application of said control signal to said input circuit, and step (c) comprises extracting said analog information from said control signal in accordance with the magnitude of said analog current flowing through said single pin in response to application of said control signal to said input circuit.

13. The method according to claim 11, wherein said digital information is represented by transitions between logic voltage levels of said control signal.

14. The method according to claim 13, wherein step (b) comprises extracting said digital information from said control signal in accordance with the polarity of a voltage pulse produced at said single pin in response to application of said control signal to said input circuit, and step (c) comprises extracting said analog information from said control signal in accordance with the magnitude of said analog current flowing through said single pin in response to application of said control signal to said input circuit.

15. The method according to claim 14, wherein said input circuit comprises a high-pass filter.

16. The method according to claim 9, wherein said input circuit comprises a programming resistor coupled to said single pin.

17. A driver circuit for a DC-DC converter, the driver circuit comprising:
  a multiplexing circuit for multiplexing digital information and analog information contained in a control signal by way of a single pin of said driver circuit, said digital information being representative of a selected one of plural modes of operation of said converter, and said analog information being representative of an operational parameter of said converter, said multiplexing circuit including an input circuit through which said control signal is applied to said single pin of said driver circuit, said input circuit comprising a programming resistor coupled to said single pin;
  a digital information extraction circuit coupled between said single pin and said driver circuit, and being operative to extract said digital information from said control signal and to supply said digital information to said driver circuit; and
  an analog information extraction circuit coupled between said single pin and said driver circuit, and being operative to extract said analog information from said control signal and to supply said analog information to said driver circuit;
  wherein said digital information extraction circuit is operative to extract said digital information from said control signal based upon a direction of flow of an analog current through said single pin, said analog current flowing through said single pin in response to application of said control signal to said input circuit and
  wherein said analog information extraction circuit is operative to extract said analog information from said control signal based upon a magnitude of said analog current flowing through said single pin in response to application of said control signal to said input circuit.

18. The driver circuit according to claim 17, wherein said digital information extraction circuit is operative to extract said digital information from said control signal based upon a polarity of an electrical condition produced at said single pin in response to application of said control signal to said input circuit.

* * * * *